May 8, 1962
C. B. MORGAN ET AL
3,033,216
MULTI-OPERATION NORMALLY CLOSED VALVE
Filed May 13, 1959
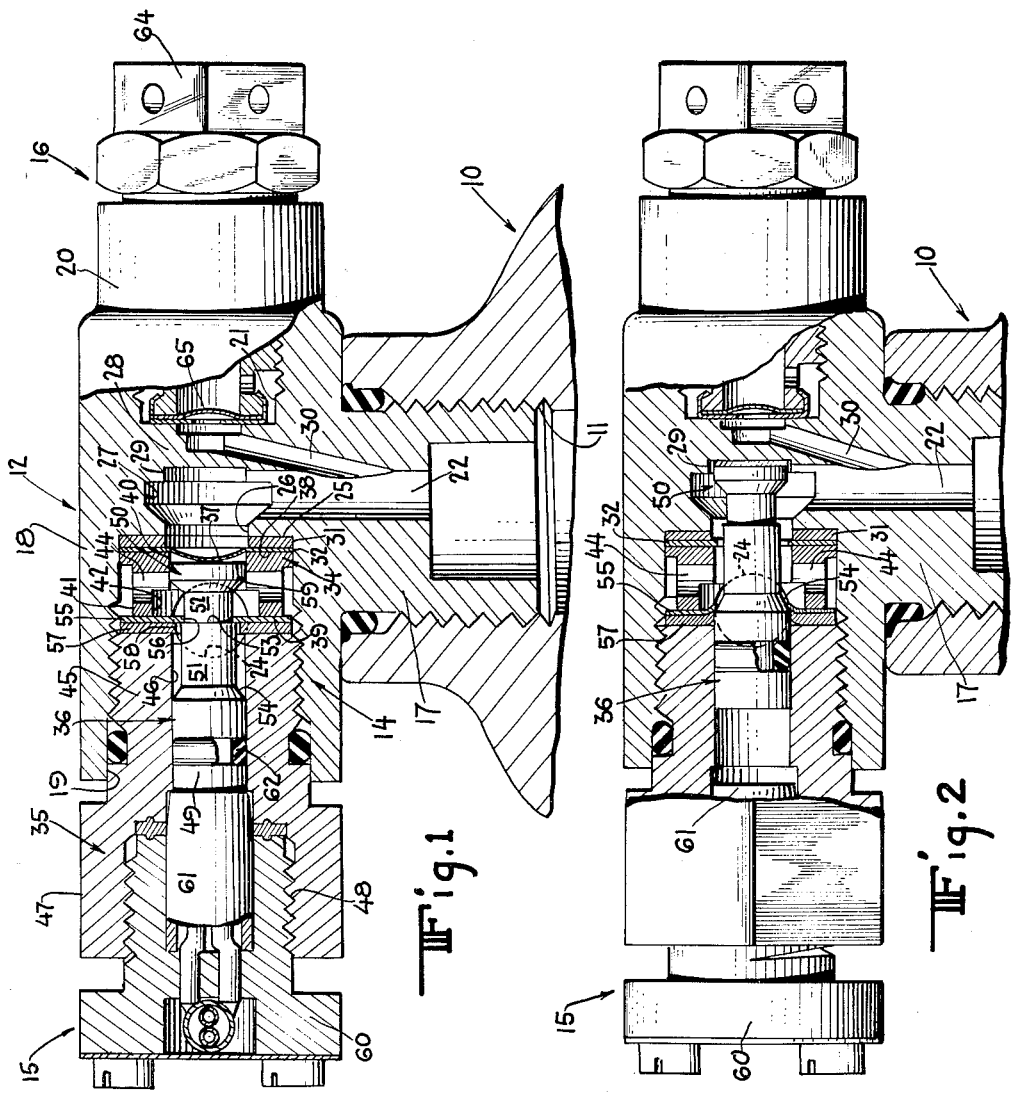
INVENTORS
Carrel B. Morgan
BY William A.V. Thomsen
J. William Carson
ATTORNEY United States Patent Office 3,033,216
Patented May 8, 1962

3,033,216
MULTI-OPERATION NORMALLY CLOSED
VALVE
Carrel B. Morgan, Packanack Lake, and William A. V. Thomsen, Glen Ridge, N.J., assignors to Specialties Development Corporation, Belleville, N.J., a corporation of New Jersey
Filed May 13, 1959, Ser. No. 812,972
3 Claims. (Cl. 137—68)

The present invention relates to valves which are normally closed by a disc for sealing the outlet thereof and which utilize a ram for punching out a portion of the disc to open the valve, and, more particularly, to an improved valve of this type wherein the disc and other parts which may be distorted during the opening of the valve can be replaced, whereby the valve is adapted for multi-operation.

Such valves are generally known as cutter valves, and many types have been proposed for releasing carbon dioxide in its use as a fire extinguishing medium and other uses and many patents have issued on such valves. However, in connection with releasing a compressed gas under several thousand pounds per square inch for use on missiles, satellites and related space craft, certain factors are introduced which render these prior known valves unsuitable for such use.

More recently, in order to meet the more stringent requirements for use on missiles and the like, it has been proposed to use a single operation normally closed valve wherein a diaphragm is formed integrally with a metallic valve body between its inlet and outlet chambers. This requires that the valve body be drilled coaxially to form an integral wall serving as the diaphragm. These operations must be performed precisely to maintain the wall thickness within prescribed tolerances so that the wall can withstand the working pressure of the compressed gas and at the same time be punched out without resorting to overpowered ram actuating means, and hence are quite costly. Such a valve is disclosed in United States Patent 2,815,882, December 10, 1957.

Also, since a large number of such valves are tested before a single valve is installed in a missile or the like for actual use, it is poor economy to use an expensive valve, which can be operated only once and then must be discarded as scrap. Furthermore, the testing of such valves is meaningless because, even if the wall thickness can be maintained within the prescribed tolerances, there is no assurance that the metallurgical properties of the walls are sufficiently identical in each instance to comply with their load bearing and punching out requirements.

Accordingly, the principal object of the present invention is to provide a multi-operation normally closed valve suitable for use on missiles and the like which is not subject to the foregoing difficulty.

Another object is to provide such a valve wherein the ram is positively retained in its non-operated position to resist unintentional movement thereof.

Another object is to provide such a valve wherein the ram is locked in its operated position without damaging the major components of the valve.

Another object is to provide such a valve wherein the replaceable parts are adjacent each other and can be replaced with a minimum of effort.

Another object is to provide such a valve wherein the ram head and the disc are so constructed and arranged to prevent fragmentation of the disc whereby a single piece is punched out.

Another object is to provide such a valve wherein the entire punched out portion of the disc is trapped and confined against escape into the outlet of the valve.

Another object is to provide such a valve wherein safety discharge means are so constructed and arranged that a pressure wave created by the ram will not cause unintentional operation thereof.

A further object is to provide such a valve which is simple and economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

FIG. 1 is a fragmentary view of a valve and a receptacle for storing compressed gas partly in elevation and partly in longitudinal section, the valve being shown in its closed position.

FIG. 2 is a view similar to FIG. 1 with the valve shown in its open position.

Referring to the drawing in detail, there is shown a receptacle 10 for storing compressed gas such as air or nitrogen under a pressure of several thousand pounds per square inch having an outlet 11 controlled by a valve 12 in accordance with the present invention. The valve generally comprises a body 14 containing the valve mechanism, an explosive actuator 15 at one end of the body and a safety disc and anti-recoil arrangement 16 at the other end of the body.

The valve body is generally T-shaped, and has a vertical section 17 which is screw threaded into the outlet 11 of the receptacle, a horizontal section 18 formed with a bore 19 for housing the valve mechanism, and a second horizontal section 20 formed with a bore 21 for housing the safety disc and anti-recoil arrangement. The valve body further includes an inlet 22 extending upwardly through the section 17, an outlet 24 communicating with the bore 19, a shoulder 25 at the inner end of the bore 19 formed with a port 26, a chamber 27 between the port 26 and the upper end of the inlet 22, a wall 28 facing the port and formed with a recess 29 corresponding substantially in dimension and configuration to the port for the purpose to be described hereinafter, and a passageway 30 extending from the lower end of the inlet 22 to in back of the wall 28 and in communication with the bore 21 for the purpose likewise to be described hereinafter.

The valve mechanism generally comprises a sealing washer 31, a disc 32, a retainer 34 for the disc, a ram cylinder 35, and a ram 36.

The washer 31 is formed of a deformable metal such as copper and cooperates with the shoulder 25 and the disc 32 to form a seal capable of confining compressed gas at a pressure as high as 5000 p.s.i. within the temperature range of −65° to 165° F. The disc 32 is formed of gold plated bronze and its thickness and structural strength can be accurately controlled to withstand pressures up to about 7500 p.s.i. As shown herein, the disc has a central portion 37 of about the same area as the port 26 which is dished away from the shoulder 25.

The retainer 34 is an annular member having an end face 38 for engaging the disc 32, an end face 39 adapted to be urged by the ram cylinder towards the shoulder 25, a bore portion 40 of about the same area as the central portion 37 of the disc, a portion 41 of reduced diameter adjacent the end face 39 and provided with an enlarged bore portion 42, and a plurality of radially extending apertures 44 for providing fluid flow communication between the bore portions and the valve outlet 24 by way of the bore 19.

The ram cylinder 35 comprises an inner section 45 screw threaded into the bore 19 for urging the disc retainer 34 towards the shoulder which section has a bore 46 therein constituting the cylinder for the ram 36, and a section 47 of enlarged diameter outwardly disposed of the bore 19 and having an enlarged bore 48 for reception of the actuator.

The ram has a piston portion 49 at one end slidably disposed in the cylinder 46, a head 50 at its other end dimensioned to pass through the bore portion 40 of the retainer and the port 26, and an intermediate portion 51 of reduced diameter. For the purpose about to be described, the ram further has an annular recess 52 in its portion 51 adjacent the head 50 providing a shoulder 53 and a tapered portion 54 joining the portion 51 and the piston portion 49.

In order to lock the ram in its non-operated position as shown in FIG. 1, a relatively thin and stiff washer 55, formed of beryllium copper for example, is inserted between the retainer 34 and the ram cylinder 35, which washer has a hole 56 of slightly smaller diameter than the reduced portion 51 of the ram so that the shoulder 53 of the ram is adapted to engage the washer adjacent the periphery of the hole to prevent movement of the ram towards the disc. Likewise, in order to lock the ram in its operated position as shown in FIG. 2, a yieldable metallic gasket 57, formed of annealed stainless steel for example, is inserted between the retainer 34 and the ram cylinder, preferably between the ram cylinder and the washer 55, which gasket has a hole 58 of slightly smaller diameter than the zone of minimum diameter of the tapered ram portion 54 so that when the ram is driven through the disc 32 the tapered portion 54 deforms the gasket at the periphery of its hole and is jammed into the gasket so tightly that the ram is retained in its operated position.

The working surface 59 of the head of the ram is flat and circular to reduce the cost of making the ram and shears and punches out cleanly the central portion of the disc without tearing or fragmentation of the disc, whereby the punched out portion of the disc truly is a single piece and metallic particles are not carried downstream with the discharged compressed gas.

The actuator 15 comprises a hollow plug 60 screw threaded into the bore 48 of the ram cylinder, an explosive charge or squib 61 contained in the plug and partially inserted into the bore 45 of the ram cylinder, and electrical connections for the squib. In order to prevent products of the explosion from getting past the piston portion 49 of the ram and into discharged compressed gas, the ram carries a packing 62 such as a synthetic rubber O-ring.

The safety discharge and anti-recoil arrangement 16 is conventional and need not be fully described and illustrated. In general, this arrangement comprises an anti-recoil plug 64 and a safety disc 65 which is located in back of the wall 28 so that it cannot sense the pressure wave created by the ram as it punches out the disc. The pressure at which the safety disc will burst is between the working pressure and the proof pressure of the disc 32 and is well below the pressure at which the disc 32 will burst so that in no case the disc 32 can burst because of an excessive pressure condition in the receptacle, such condition being relieved by the safety disc.

In operation, with the receptacle charged and the parts positioned as shown in FIG. 1, the squib is fired thus generating a pressure which drives the ram through the disc 32 to punch out its central section and trap the same in the recess 29 as shown in FIG. 2. As this occurs, the shoulder 53 on the ram deflects the washer 55 to allow the ram to pass through the hole thereof, and the tapered portion 54 of the ram is driven into the gasket 57 to lock the ram in its operated position.

After operation has been completed, the ram cylinder is unscrewed from the valve body, the disc 32, the washer 55 and the gasket 57 are removed and replaced, and the cylinder is again secured to the valve body. After replacing the actuator with one having an unfired squib and recharging the receptacle, the valve is in service for further operation.

From the foregoing description, it will be seen that the present invention provides an improved multi-operation normally closed valve which has the required features of safety, cleanliness and reliability to enable it to be used in connection with missiles and the like.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. A normally closed valve for confining fluid under high pressure comprising a body having a bore provided with a shoulder, an inlet at one side of said shoulder for fluid under high pressure and an outlet at the other side of said shoulder; a rupturable disc in said bore adjacent said shoulder at the outlet side thereof constructed and arranged to withstand pressures in excess of the pressure of the fluid to thereby confine the same against unintentional release; removable means for retaining said disc in said bore; a ram cylinder removably secured in said bore for urging said retaining means towards said shoulder whereby said disc is removably mounted; a ram for said cylinder having a punching head at one end adjacent said disc, a piston portion at its other end slidably mounted in said cylinder, a portion of reduced diameter between said head and said piston portion, and an annular recess on said reduced diameter portion adjacent said head providing a shoulder facing said head; a stiff washer removably mounted between said retaining means and said cylinder having an aperture of slightly smaller diameter than that of said reduced diameter portion whereby said washer is engaged by said last mentioned shoulder to retain said ram in a non-operated position; and means in said cylinder at the piston portion end of said ram for actuating said ram to cause said head to punch out a portion of said disc.

2. A normally closed valve for confining fluid under high pressure comprising a body having a bore provided with a shoulder, an inlet at one side of said shoulder for fluid under high pressure and an outlet at the other side of said shoulder; a rupturable disc in said bore adjacent said shoulder at the outlet side thereof constructed and arranged to withstand pressures in excess of the pressure of the fluid to thereby confine the same against unintentional release; removable means for retaining said disc in said bore; a ram cylinder removably secured in said bore for urging said retaining means towards said shoulder whereby said disc is removably mounted; a ram for said cylinder having a punching head at one end adjacent said disc, a piston portion at its other end slidably mounted in said cylinder, a portion of reduced diameter between said head and said piston portion, an annular recess on said reduced diameter portion adjacent said head providing a shoulder facing said head and a tapered portion between said reduced diameter portion and said piston portion; a stiff washer removably mounted between said retaining means and said cylinder having an aperture of slightly smaller diameter than that of said reduced diameter portion whereby said washer is engaged by said last mentioned shoulder to retain said ram in a non-operated position; a yieldable gasket removably mounted between said washer and said cylinder having an aperture of slightly smaller diameter than that of said piston portion to provide a friction fit about said piston portion and retain said ram in its operated position; and means in said cylinder at the piston portion end of said ram for actuating said ram to cause said head to punch out a portion of said disc.

3. A normally closed valve for confining fluid under high pressure comprising a body having a bore provided with a shoulder, an inlet at one side of said shoulder for fluid under high pressure and an outlet at the other side of said shoulder; a rupturable disc in said bore adjacent said shoulder at the outlet side thereof constructed and arranged to withstand pressures in excess of the pressure of the fluid to thereby confine the same against unintentional release; removable means for retaining said disc in said bore; a ram cylinder removably secured in said bore for urging said retaining means towards said shoulder whereby said disc is removably mounted; a ram for said cylinder having a punching head at one end adjacent said disc, a piston portion at its other end slidably mounted in said cylinder, and a portion of reduced diameter between said head and said piston portion; means in said cylinder at the piston portion end of said ram for actuating said ram to cause said head to punch out a portion of said disc; said bore terminating in a wall facing said disc having a recess therein corresponding substantially in dimension and configuration to the punched out portion of said disc to receive the same and retain the same therein when said ram is in its operated position; and safety discharge means in said valve body in back of said wall including a disc constructed and arranged to rupture in response to a lower pressure than said first mentioned disc can withstand and a passageway extending from the upstream end of said valve body inlet to in back of said wall, said disc being parallel to said wall whereby said wall isolates said safety means to prevent unintentional operation thereof in response to a pressure wave created by said ram as it is actuated.

References Cited in the file of this patent
UNITED STATES PATENTS

| | | |
|---|---|---|
| 1,959,822 | Greve | May 22, 1934 |
| 2,515,068 | Young | July 11, 1950 |
| 2,717,042 | Grant | Sept. 6, 1955 |
| 2,815,882 | Connell | Dec. 10, 1957 |
| 2,865,225 | Huffman | Dec. 23, 1958 |
| 2,937,654 | Wilner | May 24, 1960 |
| 2,966,163 | Nylin | Dec. 27, 1960 |